United States Patent [19]

Minto

[11] Patent Number: 5,757,641
[45] Date of Patent: May 26, 1998

[54] TRIPLEX CONTROL SYSTEM WITH SENSOR FAILURE COMPENSATION

[75] Inventor: Karl Dean Minto, Ballston Lake, N.Y.

[73] Assignee: General Electric Company, Schenectady, N.Y.

[21] Appl. No.: 498,273

[22] Filed: Jul. 3, 1995

[51] Int. Cl.[6] .......................... G05B 15/00; G05B 19/18
[52] U.S. Cl. .............. 364/133; 395/182.08; 303/122.05; 303/122.08; 303/122.07; 235/440; 235/441; 235/446
[58] Field of Search ................... 364/133, 551.01; 395/20, 25, 182.08; 303/122.05, 122.08, 122.07; 235/440, 441, 446

[56] References Cited

U.S. PATENT DOCUMENTS

| | | | |
|---|---|---|---|
| 4,106,730 | 8/1978 | Spitzer et al. | 244/183 |
| 4,644,538 | 2/1987 | Cooper et al. | 395/182.08 |
| 5,130,563 | 7/1992 | Nabet et al. | 395/25 |
| 5,214,913 | 6/1993 | Tani et al. | 60/39.281 |
| 5,521,844 | 5/1996 | Karis | 364/551.01 |
| 5,572,627 | 11/1996 | Brown | 395/20 |
| 5,579,440 | 11/1996 | Brown | 395/20 |

FOREIGN PATENT DOCUMENTS

| | | | |
|---|---|---|---|
| 0074862 | 3/1983 | European Pat. Off. | G05B 5/01 |
| 0122048 | 10/1984 | European Pat. Off. | G06F 15/06 |

OTHER PUBLICATIONS

Nelson P.A. & Elliott S.J., Active Control, of Sound, GB, London, Academic Press 436 biz.; G10k11/16, pp. 113–115, Oct. 16, 1992.

NASA Technical Paper 2740, Walter C. Merrill et al., Advanced Detection, Isolation, and Accommodation of Sensor Failures—Real-Time Evaluation, Jul. 1987.

NASA Technical Paper 2836, Walter C. Merrill et al., Advanced Detection, Isolation, and Accommodation of Sensor Failures, Nov. 1988.

*Primary Examiner*—Reba I. Elmore
*Assistant Examiner*—McDieunel Marc
*Attorney, Agent, or Firm*—Donald S. Ingraham

[57] ABSTRACT

A triplex control system provides automatic compensation for a sensor bias failure in one channel while continuing to process all sensor readout signals. The triplex control system includes first through third non-linear feedback channel processors, each being coupled to a respective sensor to receive a readout signal therefrom. Each channel processor comprises a control algorithm module and feedback loop correction circuit coupled together so as to generate a channel output signal in correspondence with a channel control algorithm and a feedback loop correction signal. The respective channel feedback loop correction signal is generated by the feedback loop correction circuit to provide sensor failure compensation; the feedback signal has a bias sense and magnitude that serves to correct the channel output signal so as to drive it towards the average of the channel control signals from each of the channel processors. Each feedback loop correction circuit comprises a residual signal generator that receives the sensor readout signal from each respective sensor and is adapted to generate a signal to provide the bias sense to the feedback loop correction circuit. The control system additionally has an controller output selection module for providing an control system output signal in correspondence with a selected function, such as an average or median value of the respective channel output signals.

14 Claims, 2 Drawing Sheets o———o———o No Failure

▲———▲———▲ Sensor Failure With Correction Circuit

□———□———□ Sensor Failure Without Correction Circuit o———o———o No Failure

▲———▲———▲ Sensor Failure With Correction Circuit

□———□———□ Sensor Failure Without Correction Circuit

TRIPLEX CONTROL SYSTEM WITH SENSOR FAILURE COMPENSATION

BACKGROUND OF THE INVENTION

This invention relates generally to redundant control systems and in particular to sensor-failure correction for control systems having three or more sensor channels.

Control systems for devices such as turbines used for generation of electricity or turbines used in aircraft engines typically monitor a variety of turbine performance parameters, including speed, temperatures, and stresses on the turbine assembly. To provide reliability, such control systems typically have multiple sensors that are used for measuring any given parameter; the control system must be adapted to handle variations in the readouts of sensors for a given parameter, such as might occur on the failure of a given sensor. Most commonly three separate sensors are used for monitoring a given parameter to provide the desired redundancy.

The most common conventional control system addresses this issue by employing hardware redundancy, that is, respective identical channels for processing the readout signals from the multiple sensors, and cross-channel data sharing to detect and isolate sensor failures. The cross-channel data link is used to determine whether a particular channel's input from its respective sensor corresponds with those of the other channels; if a difference develops in one sensor channel, that particular channel is assumed to be processing corrupted sensor data and that sensor, and its associated processing channel, are disengaged from the control system. Once disengaged, the channel cannot be readily returned to the loop without maintenance attention that usually requires the shutdown of the device being monitored (e.g., the engine).

Another approach to safe and reliable control is referred to as analytic redundancy, which involves an mixture of hardware and software redundancy. Typically a dynamic model of the device being controlled is maintained in an on-line computer, which is used to predict sensed outputs for comparison with actual measured values of the parameter.

One disadvantage of the current hardware redundancy schemes is sensitivity to false alarms and the loss of a control channel in the event of short term, transient sensor failures. Moreover, the computations used to evaluate and reject a failed sensor channel are also subject to sources of error in addition to sensor failure, such as measurement noise, loss of sampling synchronization, analog/digital quantization errors, and the like. As such control systems require rapid detection and corrective action in the event of sensor faults, it is frequently expedient to use simple and conservative threshold tests which are vulnerable to false alarms or short term transients. Analytic redundancy schemes suffer from complexity inherent in implementing a real-time model of the monitored device on-line and the need for sophisticated signal processing functions, such as Kalman filters, to identify and isolate failures.

SUMMARY OF THE INVENTION

In accordance with this invention, a triplex control system provides automatic compensation for sensor bias failures in one channel while continuing to process sensor readout signals from all sensors. The system control output remains uncorrupted by an aberrant signal from one sensor and the system thus provides an effective means for handling transient sensor bias failures (or aberrant signals) without losing that sensing channel from the control system.

The triplex control system includes first through third non-linear feedback channel processors, each being coupled to a respective sensor to receive a readout signal therefrom. Each channel processor comprises a control algorithm module and feedback loop correction circuit coupled together so as to generate a channel output signal in correspondence with a channel control algorithm and a feedback loop correction signal. The respective channel feedback loop correction signal is generated by the feedback loop correction circuit to provide sensor failure compensation; the feedback signal has a bias sense and magnitude that serves to correct the channel output signal so as to drive it towards the average of the channel control signals from each of the channel processors. Each feedback loop correction circuit comprises a residual signal generator that receives the sensor readout signal from each respective sensor and is adapted to generate a signal to provide the bias sense to the feedback loop correction circuit. The control system additionally has an controller output selection module for providing an control system output signal in correspondence with a selected function, such as an average or median value of the respective channel output signals.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
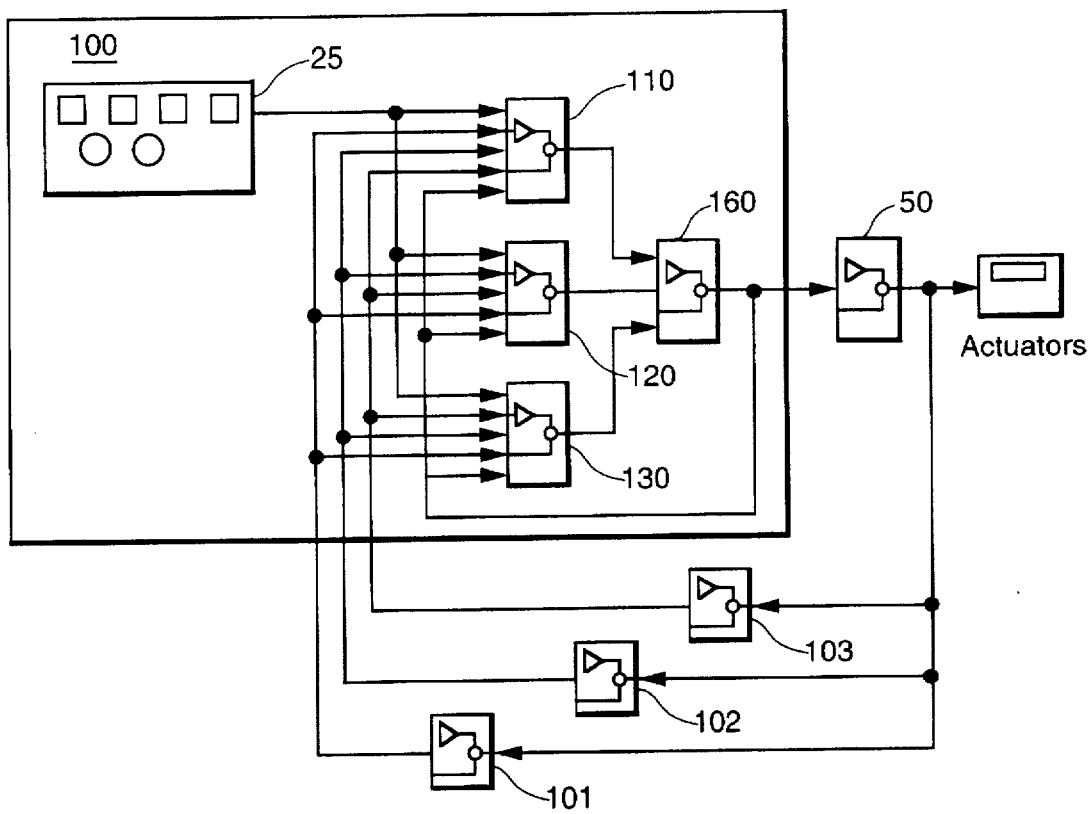
FIG. 1 is a block diagram of a triplex control system in accordance with this invention.

A control system 100 (FIG. 1) in accordance with this invention is coupled to a plant 50 that is monitored and controlled to maintain a desired operating profile. Plant 50 typically comprises complex operating machinery requiring monitoring of various operating parameters to ensure proper operation. For example, turbines (gas or steam powered) and associated generators are commonly used in power generation plants; turbines are also commonly used in marine and aircraft propulsion systems. An operator or an operating system for plant 50 typically determines some desired nominal performance (such as determining a desired power output from the turbine in plant 50) that implies nominal setpoints for plant operating parameters; such nominal setpoints are generated by a setpoint module 25. Due to the complexity and sensitivity of such a plant, safe and effective operation requires redundant monitoring of plant operating parameters, such as temperatures, pressures, speeds, fluid flows, structural stresses or the like. Plant 50 typically would comprise a plurality of control systems 100 that are directed towards the monitoring and control of a given plant operating parameter. By way of example, one control system coupled to plant 50 is described herein although plant 50 may comprise multiple such control systems for management of various operating parameters. The output of control system 100 is a control signal that is a function of the processed parameter signals from each separate sensor monitoring the selected parameter of the plant 50 and the nominal setpoints for such parameters as generated by setpoint module 25. In accordance with this invention, a reliable and uncorrupted system output control signal is generated using the readout of each of the respective sensors, even when the readout of a given sensor is at variance with the other sensors, such as in the event of a transient failure of the sensor. The output control signal of controller 100 is typically used to govern the operation of turbine controllers (e.g., fuel supply actuators, turbine guide vane actuators, lubrication system actuators, and the like) or indications (such as temperatures, pressures, thrust, or the like) that can be used by the operator (or operating system) to govern operation of plant 50.

In one embodiment of the present invention as illustrated in FIG. 1, control system 100 comprises a triplex control system, that is, a system having three channels for processing sensor readout data. Triplex control system 100 is coupled to a first sensor 101 that in turn is coupled to a first channel processor 110; a second sensor 102 coupled to a second channel processor 120; and a third sensor 103 that is coupled to a third channel processor 130. The word "channel" is commonly used to refer to each set of circuitry for processing a sensor signal in accordance with the control algorithm used for control of plant 50. In the context of plant 50, "channel" also usually includes the "local" sensor associated with a given channel, e.g., first sensor 101 and first channel processor 110 collectively constitute the first channel and first sensor 101 is referred to as the "local" controller for the first channel. Each sensor coupled to control system 100 is adapted to measure (or readout) the same operating parameter of plant 50 (e.g., temperature, pressure, or the like), although respective sensors 101, 102, 103, are typically disposed at physically separate locations within plant 50. Sensors 101, 102, 103 typically comprise analog sensors (that is, the readout signal corresponding to the sensed parameter is in the nature of an analog signal); alternatively, the sensors may comprise digital sensors.

Figure 2:
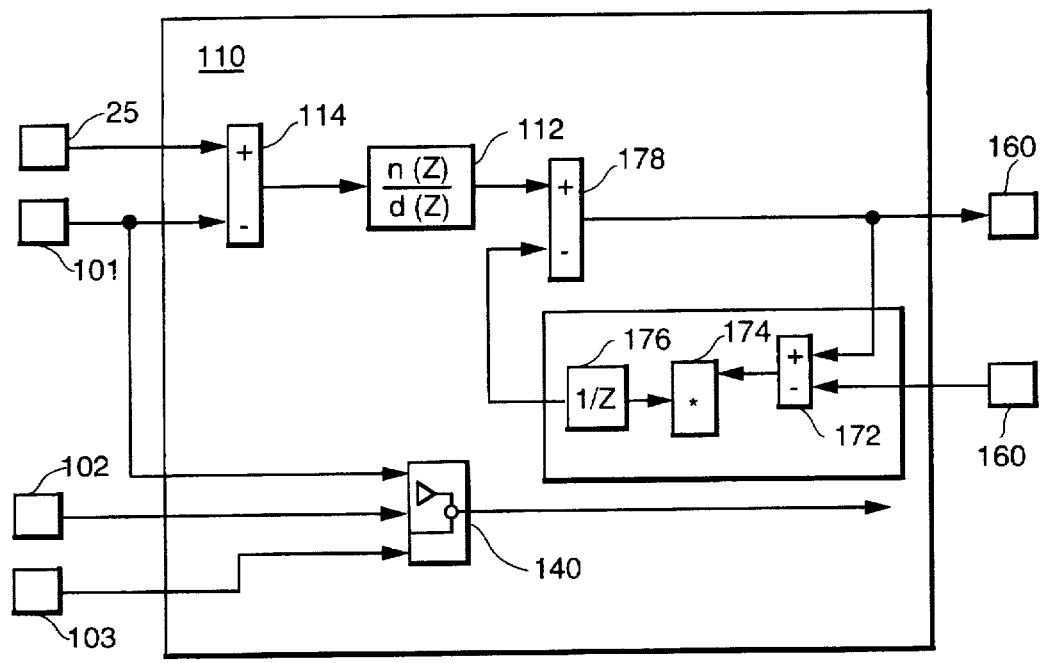
FIG. 2 is a partial schematic and partial block diagram of a non-linear feedback channel processor in accordance with this invention.

Triplex controller 100 comprises first, second, and third non-linear feedback channel processors 110, 120, 130. As illustrated in FIG. 2, the circuitry of each non-linear feedback channel processor comprises a respective residual signal generator 140 (only first channel processor 110 is shown for illustration purposes; second and third channel processors are arranged in an analogous manner with respect to processing of the local sensor signal and generating a residual signal). Each channel processor 110, 120, and 130 is coupled to receive the readout signal from each of first, second, and third sensors 101, 102, and 103. Channel processors 110, 120, and 130 are each further coupled to a control system output selection module 160 to provide the respective channel processor output signal thereto; the system control signal to plant 50 is generated in controller output selection module 160, which is coupled to plant 50 to provide the control signal thereto in accordance with a selected function, such as the average or median value of the respective channel output signals.

First channel processor 110 as illustrated in FIG. 2 is described herein as representative of channel processors 120 and 130. Channel processor 110 comprises a respective channel control algorithm module 112, a respective a sensor-setpoint combining element (or summing junction) 114, respective residual generator 140, and a respective non-linear feedback loop correction circuit 170. Channel control algorithm module 112 is coupled to combining element 114 so as to receive a sensor-setpoint error signal that is a combination (typically a difference between the two combined signals) of the local sensor readout signal from first channel sensor 101 (as illustrated in FIG. 2) and the parameter setpoint signal from setpoint module 25. Channel control algorithm module 112 (and additionally other processing modules and elements in channel processor 110 as described herein) comprises a microprocessor, microcontroller, application specific integrated circuit (ASIC), digital signal processor (DSP), or the like, that is programmed to perform a selected function. Channel control algorithm module 112 is programmed with a selected control algorithm, generically expressed as a transfer function $G(z)$, which includes, for example, transfer functions often noted by the terminology $n(z)/d(z)$ which are indicative of a transfer function in the unit delay operator $z$. For example, the control algorithm is commonly a proportional-integral (PI) algorithm. Control algorithm module 112 is further coupled so as to provide the control algorithm module output signal (that is, the signal generated by module 112) to non-linear feedback loop correction circuit 170.

Figure 3:
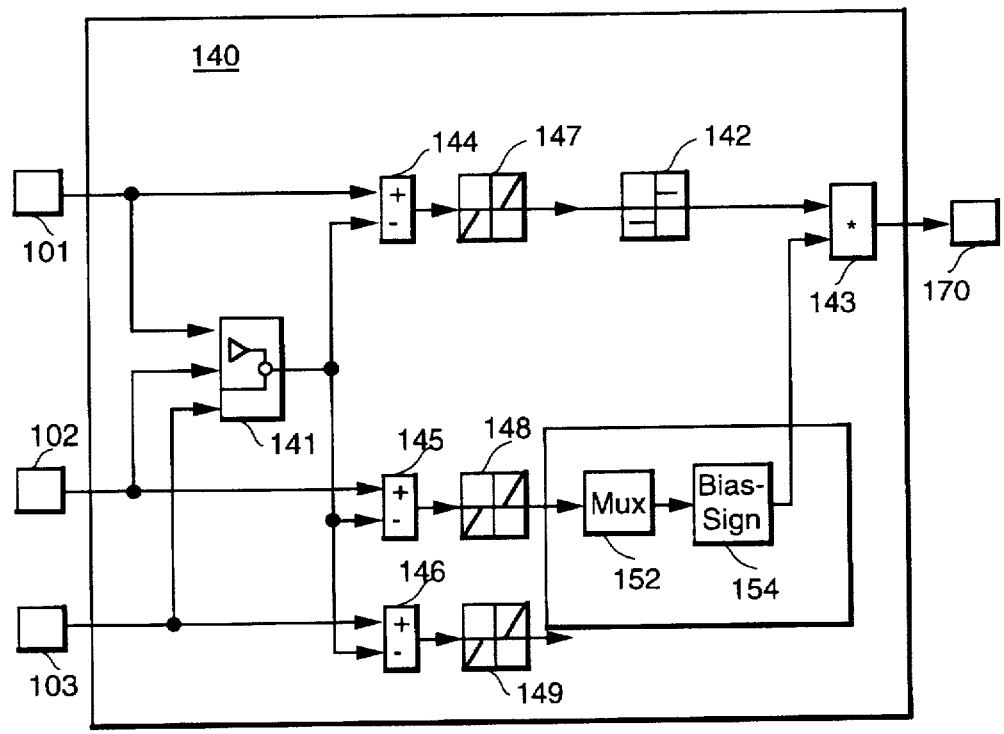
FIG. 3 is a partial schematic and partial block diagram of a residual signal generator in accordance with this invention.

The respective channel control processor residual signal generator 140 (FIG. 2) is coupled to receive the local sensor readout signal (e.g., sensor 101 readout signal in first channel processor 110) and the readout signals from each "external" (that is, non-local) sensor (e.g., second channel sensor 102 and third channel sensor 103 readout signals). A detail view of residual signal generator 140 is illustrated in FIG. 3 (as noted above, first channel processor residual signal generator 140 is shown as representative of the respective residual signal generators in each channel). The residual signal generator 140 is further coupled to the respective feedback loop correction circuit 170 in the channel processor so as to provide a residual signal to the feedback correction circuit. The residual signal provides the bias sense (that is, positive, negative, or null) for the feedback signal to be applied to the output of control algorithm module 112 and is used to influence the feedback loop correction signal generated by feedback correction circuit 170. Thus, the residual signal typically has a value of "+1", "−1", or zero.

Residual signal generator 140 (FIG. 3) comprises a sensor readout signal averaging element 141 that is coupled to receive the sensor readout signal from the local and the external sensors (for the given operating parameter monitored) to which control system 100 is coupled. Averaging element 141 comprises a processor adapted to provide the arithmetical average of the respective signals from the local and external signals. Residual signal generator 140 further comprises a local channel combining element 144, a first external channel combining element 145, and a second external channel combining element 146, each of which is coupled to its respective channel sensor (e.g., in first channel processor 110, local channel combining element 144 is coupled to first sensor 101 to receive the first sensor readout signal therefrom, first external channel combining element 145 is coupled to second channel sensor 102, and second external channel combining element is coupled to third channel sensor 103). Each combining element 144, 145, and 146 is further coupled to averaging element 141 so as to receive the averaged sensor readout signal therefrom. Each combining element comprises a device for combining the respective sensor readout signal and the averaged sensor readout signal. By way of example and not limitation, in the embodiment illustrated in FIG. 3, combining elements 144, 145, and 146 each comprise devices by which a respective difference signal is generated that corresponds to difference between the respective channel sensor readout signal and the averaged sensor readout signal.

Each channel combining element 144, 145, and 146 is coupled to a respective filter 147, 148, and 149 (e.g., local channel combining element 144 is coupled to filter 147, first external channel combining element is coupled to filter 148, and so forth). Filters 147, 148, and 149 typically comprise a band-stop type filter (also referred to as a deadband block) that is selected to force the value of the respective channel error signals to zero if the difference between the sensor readout signal and the average of the sensor readout signals is sufficiently small. The deadband blocks (or filters) 147, 148, and 149 are designed such that the output from the blocks (or filters) is zero unless the magnitude of the input exceeds a predetermined value, in which case the filter passes the signal so that the output signal of the filter is the same as the input signal. The predetermined signal magnitudes that will cause deadband blocks 147, 148, and 149 to pass the signal are determined by design parameters of a given control system to attenuate noise from the system. For example, the threshold or quantum should at least be larger than the analog-to-digital (A-to-D) quantization size for A-to-D converters in the circuit; the quantum may be even larger depending on a given sensor and circuit design.

Each respective residual signal generator 140 further comprises a signum function module 142 that is coupled to local channel filter 147 to receive the local channel residual error signal therefrom. Signum function module comprises circuitry to perform the computation that converts the analog local channel residual signal to a (+1) or a (−1) value for use as a multiplicand in a multiplication module 143. This signum function module monitors zero cross points of the analog signal and converts any input value greater than zero into the value of (+1), and any input value less than zero into the value of (−1); typically an input of exactly zero is assigned an output value of zero as well. Thus a null residual input signal results in a zero output that (as a multiplicand) nulls the residual signal generated by the respective channel residual signal generator.

Each respective residual signal generator 140 also comprises a comparison module 150 that is coupled to receive the output signals from each of the deadband blocks 147, 148, and 149. Comparison module 150 comprises a mux element 152 that receives each of the respective deadband block output signals, which are scalar signals, and converts these signals to a vector signal. Mux element 152 is coupled to a bias-sign module 154 to provide the vector signal generated by mux element 152 to the bias-sign module. Bias sign module 154 comprises a processor having a function that determines the sign of the largest component of the vector signal so as to generate a bias output signal of zero, "+1" or "−1". Expressed mathematically, vector $e=[e_1, e_2, e_3]$ is a vector of three scalar error signals $e_1, e_2, e_3$;

$e_j$ is the element of vector e with the largest magnitude. The output of bias-sign module 154 corresponds to:

sign($e_j$)

in which the function "sign" returns of value of "+1" if its argument is greater than zero, "−1" if the argument is less than zero, and zero if the argument is zero.

Comparison module 150 is further coupled to multiplication module 143; signum function module 142 is also coupled to multiplication module 143. The output signal of signum function module 142 is either "+1", "−1", or zero; the output signal of comparison module 150 is either a "+1" or a "−1". Thus the residual signal supplied to feedback loop correction circuit 170 is the product of these signals supplied to multiplication module 143 and is either "+1", "−1", or zero.

Each respective non-linear feedback loop correction circuit 170 (a representative one of which is illustrated in FIG. 2) comprises a feedback loop combining element 172, a multiplication module 174, and a delay block 176. Feedback circuit first combining element 172 is coupled to receive the channel output signal (the signal that is provided to control system averaging module 160) and also to receive the control system output control signal from controller output selection 160 (the signal that is provided to plant 50 to control actuators and the like, and to generate a channel-system difference signal in correspondence with the difference between the two received signals. Correction circuit 170 further comprises multiplication module 174 that is coupled to feedback loop combining element 172 to receive the channel-system difference signal therefrom, and is also coupled to the respective residual signal generator 140 for that channel processor to receive the respective channel residual signal therefrom. Multiplication module 174 generates a loop adjustment signal that is the product of the respective channel residual signal and the channel-system difference signal.

Multiplication module 174 is coupled to delay block 176 to provide the loop adjustment signal, which represents the nature of the correction (plus or minus) and a quantitative value (or gain) of the feedback. Delay block 176 typically comprises the same type of device as control algorithm module 112, and is programmed with a transfer function represented as 1/z. For illustrative purposes herein, it is assumed the nature of the transfer function in delay block 176 is chosen to provide a zero steady state error in the controller output in the event of a sensor failure; alternatively, other transfer functions to provide desired performance of controller 100 can be selected and programmed into the delay block module. Delay block 176 generates a feedback loop correction signal that is coupled to a respective processor channel second combining element 178, which in turn combines the feedback loop correction signal with the control algorithm module 112 output signal to provide the respective channel output signal.

The channel output signal passing from each respective channel second combining element (that is, the combination of the respective control algorithm module output signal and the respective feedback loop correction circuit output signal is further coupled to controller output selection module 160 (FIG. 1) which generates the control system output signal in accordance with a selected function. For example, the system output signal may correspond to the arithmetic average of the first, second, and third channel output signals; alternatively, another function can be selected, such as the median value of the respective channel output signals (other functions that may be desirable for a given plant or control philosophy may also be implemented). System output selection module 160 is coupled to control actuators in plant 50 so as to apply the control system averaged output signal to effect the desired control.

By way of example, and not limitation, control system operates in the following fashion. In steady state operating conditions of plant 50, first, second, and third sensors 101, 102, and 103 are detecting a selected operating parameter of plant 50. Control system 100 provides for the simultaneous sensing and processing of readout signals from each of the sensors. In situations in which the respective values of the readout signals from each of the three sensors are the same, no residual signals are generated in the respective residual signal generator 140 in each channel as there is no difference between individual sensor readout signals and the average of the signals. The channel-system difference signal in each respective non-linear feedback loop correction circuit 170 is zero as the value of the sensor readout signals and the average of those signals is the same. The product of these signals is similarly zero and no feedback loop correction signal is generated by the respective non-linear feedback loop correction circuits 170.

In the event one sensor fails or otherwise experiences a transient that results in a change in the value of the sensor readout signal with respect to the other sensor readout signals, control system 100 automatically compensates for the failure while continuing to process signals from the sensor that is failed or otherwise undergoing the transient condition. In this manner, if the sensor bias failure is transient, and the sensor later returns to proper operation, its readout signals continue to be processed by controller 100 whereas, in a conventional system, the aberrant sensor channel would be disengaged from the control circuit without ability to reinstate it (thereby leaving the control system with only two remaining sensor channels and thus vulnerable to future failures or transients). By compensating for the aberrant signal from one sensor channel, the control system overall rejects the effects that would normally be seen as a change in the steady-state output of the control system.

Figure 4:
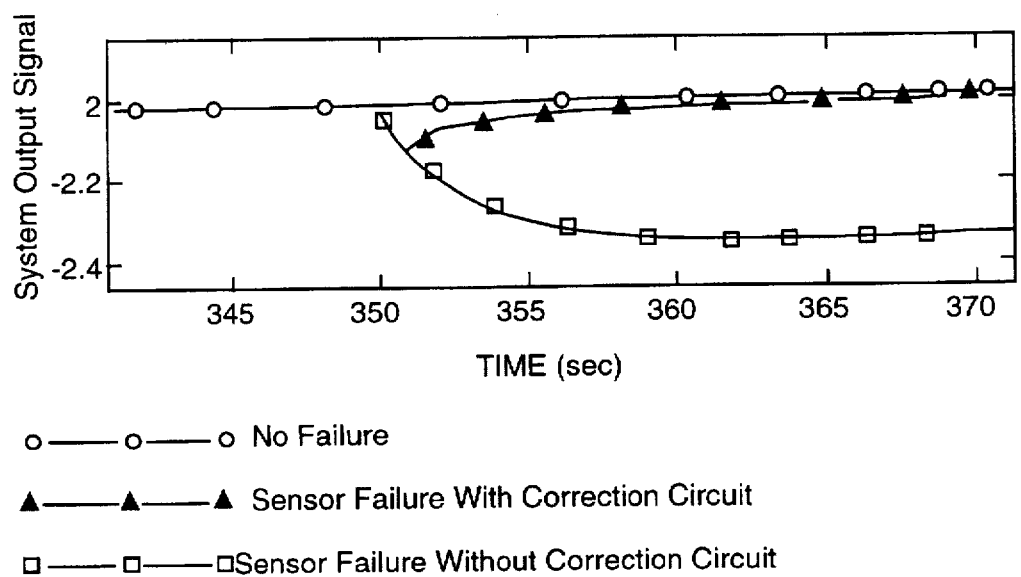
FIG. 4 is a graphic representation of controller output control signal values illustrating the effects of sensor failure on an uncorrected control system and on a triplex control system in accordance with this invention.

A simulation of a sensor failure and the corresponding change in the control output signal of controller 100 is illustrated in FIG. 4. This description provides one example of system operation for the embodiment illustrated in the Figures; minor modifications of the system, such as selection of which signals are added or subtracted in the combining elements and the selection or conversion of bias signs, for example, are matters of design choice and are within the contemplation of the structure and operation of the present invention. For example, if first sensor 101 suffers a failure of some nature by which the value of the readout signal that it generates for the measured parameter decreases substantially (that is, more than the expected noise in the system) from the values of second and third sensors 102, 103, control system 100 responds in the following manner: The sensor-setpoint error signal generated in a sensor-setpoint combining element 114 becomes larger as the magnitude of the sensor readout signal decreases; this increased sensor-setpoint error signal is fed to control algorithm module 112 which in turn generates a channel output signal that increases in magnitude. The larger first channel output signal results in a difference between the local channel output signal and the control system output signal from system output selection module 160 (for purposes of this example, it will be assumed module 160 provides an arithmetic averaging function).

In residual signal generator 140 in the channel with the sensor that has failed with a reduced magnitude readout signal, a residual signal is generated that is "−1". This residual signal results from the multiplication of the signal passing from signum function module 142 that is "+1" (due to the fact that the local channel sensor readout is less than the average of all three channel readout signals) and that the signal passing from comparison module 150 is "−1" (due to the fact that in the failed channel the vector segment having the largest magnitude is that of the failed local channel, and that error is positive).

Multiplication module 174 thus receives as input signals a "−1" signal from residual generator 140 and the signal from feedback circuit combining element that is negative and has a magnitude corresponding to the difference between the failed channel's output signal and the system averaged control signal output. The signal applied to delay block 176 thus has a positive sense (with respect to the feedback to be applied) and of a magnitude to drive the local channel output control signal to a zero error condition with respect to the averaged control system output control signal generated by averaging module 160.

In the non-failed channels, there is initially no difference between the setpoint and local sensor parameter values. Once the effect of the failed sensor manifests itself by an error signal (resulting from the initial transient effect of the failed channel on the averaged controller output signal), a sensor-setpoint error signal is generated in the respective non-failed channel combining elements 114. In this example in which the failed sensor has failed with a reduced magnitude signal, the residual generator 140 in each non-failed channel processor generates a residual signal of "+1" (resulting from multiplication of the "−1" value the local channel signum function module 142 and the "−1" value of the comparison module 150 (derived as noted above with respect to the failed sensor channel). The sense of the feedback signal generated by feedback loop correction circuit in each failed channel is thus different, tending to drive the respective channel output control signal towards the value of the averaged control system output signal.

One simulated example of performance of control system 100 is presented graphically in FIG. 4. Line 200 (highlighted with circular dots) represents a steady state output control signal from controller 100. In an uncorrected system, the failure of one sensor (sensor failing with decreased magnitude of readout signal) at time 350 seconds results in overall system output control signal magnitude decreasing as shown by line 205 (highlighted with square-shaped dots); a control system in accordance with the present invention undergoes a transient following the sensor failure but returns to the nominal non-failure steady state value thereafter, as illustrated by line 210.

An additional advantage of the control system of the present invention is that the respective residual signals are useful for diagnostic purposes. Such signals are advantageously recorded and analyzed to determine where, when, and how sensor failures occurred in the system. The systems can thus provide valuable historical data that is beneficial in maintenance and monitoring of system performance.

It will be apparent to those skilled in the art that, while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A triplex control system providing automatic compensation of sensor bias failures with continued processing of all sensor inputs, the control system comprising:

respective first, second, and third non-linear feedback channel processors, each of said channel processors being coupled to a respective channel sensor to receive a sensor readout signal therefrom and comprising a control algorithm module and a feedback loop correction circuit coupled together so as to generate a channel output signal in correspondence with a channel control algorithm;

each of said channel processors further comprising a respective residual signal generator coupled to said feedback loop correction circuit and adapted to generate a residual signal to control the bias sense of a feedback loop correction signal; and a controller output selection module for providing a control system output signal in correspondence with a selected function of the combination said respective channel output signals, said triplex control system processing each of said respective channel readout signals while generating said control system output signal.

2. The control system of claim 1 wherein the selected function of the combination of respective channel output signals in said controller output selection module comprises arithmetic averaging and median value determination.

3. The control system of claim 1 wherein each respective residual signal generator is coupled to receive each of said respective sensor readout signals and comprises a local channel residual error signal and a plurality of external channel residual error signal circuits responsive to respective channel sensor readout signals and an averaged sensor readout signal, said residual signal generator further comprising a comparison module adapted to determine the bias sense of the largest of the respective channel residual error signals.

4. The control system of claim 3 wherein said residual signal generator comprises a sensor input signal averaging element, said averaging element being coupled to a respective combining element in each of said local and external residual error signal circuits to provide said averaged sensor readout signal thereto, each of said local and external residual error signal circuit combining elements further being respectively coupled to the respective channel sensor so as to provide in each of said residual error signal circuits a respective residual error signal corresponding to the difference between the respective channel sensor readout signal and said averaged sensor readout signal.

5. The control system of claim 4 wherein each of said residual error signal circuits further comprises a filter coupled to the respective residual signal circuit combining element to receive the respective difference signal therefrom and further coupled to said comparison module to provide a respective channel residual error signal thereto.

6. The control system of claim 5 wherein each of said residual signal generators further comprises a signum function module coupled to said local channel residual error signal circuit combining element, said residual signal generator further comprising a multiplication module coupled to said signum function module and to said comparison module so as to receive respective signals therefrom and to generate a residual signal, said residual signal being the product of the respective signals from said signum function module and said comparison module.

7. The control system of claim 6 wherein each of said residual signal generators is adapted such that said residual signal generated therein comprises a signal having a value selected from the group consisting of "+1+, "−1", and zero, so as to provide a bias sense to said feedback loop correction circuit.

8. The control system of claim 1 wherein each of said channel processors comprises a respective channel control algorithm module adapted to transform an input signal in correspondence with a selected transfer function algorithm.

9. The control system of claim 8 wherein said control algorithm module is coupled to a channel second combining element and said feedback loop correction circuit is further coupled to said channel second combining element such that a channel output signal corresponding to the combination of the signal from said feedback loop correction and the signal from said control algorithm module is passed to said control system output selection module.

10. The control system of claim 9 wherein each of said respective loop correction circuits comprises a delay block module for generating a feedback signal having a bias sense corresponding to the respective channel residual signal and having a magnitude corresponding to a channel-system difference signal.

11. The control system of claim 10 wherein each of said non-linear feedback loop correction circuits further comprises a feedback loop combining element, and a multiplication module;

said feedback loop combining element being coupled to said channel second combining element to receive the channel output signal therefrom and being coupled to said controller output selection module to receive said control system output signal therefrom, said channel first combining element being adapted to generate said channel-system difference signal corresponding to the combination of said channel output signal and said control system output signal;

said multiplication module being coupled to said feedback loop combining element to receive said channel-system difference signal and further being coupled to said residual signal generator to receive said respective channel residual signal, said multiplication module being adapted to generate a loop adjustment signal corresponding to the product of the signals received by said multiplication module;

said multiplication module being coupled to said channel delay block to provide said loop adjustment signal thereto.

12. The control system of claim 1 wherein said sensors are selected from the group consisting of speed sensors, temperature sensors, flow sensors, and tension sensors.

13. The control system of claim 12 wherein said sensors are disposed in a turbine disposed in a power generation plant.

14. The control system of claim 1 wherein said sensors are disposed in a turbine engine assembly.

* * * * *